United States Patent [19]

Suzuki

[11] B 3,925,685

[45] Dec. 9, 1975

[54] TIME SHARING INFORMATION CIRCUIT

[75] Inventor: Yasoji Suzuki, Kawasaki, Japan

[73] Assignee: Tokyo Shibaura Electric Company, Ltd., Tokyo, Japan

[22] Filed: Apr. 30, 1973

[21] Appl. No.: 355,876

[44] Published under the Trial Voluntary Protest Program on January 28, 1975 as document no. B 355,876.

[52] U.S. Cl. .................. 307/205; 307/208; 307/269

[51] Int. Cl.² .......................................... H03K 17/00

[58] Field of Search .................... 307/205, 208, 269; 179/15 A, 15 BL

[56] References Cited

UNITED STATES PATENTS

| | | | |
|---|---|---|---|
| 3,393,325 | 7/1968 | Borror et al. | 307/308 |
| 3,601,634 | 8/1971 | Ebertin | 307/270 |
| 3,737,673 | 6/1973 | Suzuki | 307/305 |

FOREIGN PATENTS OR APPLICATIONS

| | | | |
|---|---|---|---|
| 1,178,460 | 9/1964 | Germany | 179/15 A |

*Primary Examiner*—Rudolph V. Rolinec
*Assistant Examiner*—B. P. Davis
*Attorney, Agent, or Firm*—Oblon, Fisher, Spivak, McClelland & Maier

[57] ABSTRACT

A time sharing information transmission circuit suitable for an integrated circuit employing insulated gate field effect transistors. The circuit comprises a time sharing circuit including the desired number of clocked inverters in accordance with input information being time shared, a restoring circuit including said desired number of clocked inverters in accordance with the time shared signals being restored, and a transmission line to transmit said time shared signal.

11 Claims, 10 Drawing Figures

TIME SHARING INFORMATION CIRCUIT

BACKGROUND OF THE INVENTION

1. Field of the Invention

The present invention generally relates to circuits suitable for an integrated circuit, and more particularly to the combination of time sharing and time restoring circuits comprised of clocked inverters of insulated gate field effect transistors.

2. Description of the Prior Art

Recently, the field of art involving an integrated circuit (IC) or a large scale integrated circuit (LSI) which employs insulated gate field effect transistors (IGFETS) including a metal oxide semiconductor (MOS) is developing rapidly. It is always desirable to elevate the production yield in order to reduce the costs of ICs or LSIs. One way to accomplish this is by improvements in the fabrication techniques. Another solution is to improve the circuit designs. In the latter technique, a decrease in the transmission line of the information signal within a chip of an IC will yield small chip sizes for ICs or LSIs. This consideration has the advantage of easy circuit design for ICs and a reduction in costs. Prior integrated circuits utilized for time sharing parallel information to series, transmitting said series information and restoring said transmitted information has certain disadvantages that restrict circuit design. For example, clock signals are restricted to a narrow frequency range, the transmission line cannot have its long line length without providing buffer amplifiers, multiple power supplies are necessary, switching time of the circuits is delayed, and it is difficult to design for uniformity of the circuits.

SUMMARY OF THE INVENTION

Accordingly, one object of the present invention is to provide a new and improved unique time sharing information transmission circuit for use as an integrated circuit.

Another object of this invention is to provide new and improved transmission circuits employing IGFETs of complementary channel conductivity type or one channel conductivity type.

A further object of this invention is to provide a new and improved transmission circuit which operates at a rapid switching rate.

A further object of this invention is to provide a new and improved transmission circuit having a simple, yet effective, circuit arrangement.

An additional object of this invention is to provide a new and improved transmission circuit wherein only one power supply is required.

Briefly, in accordance with the invention, the foregoing and other objects are in one aspect attained by providing a time sharing information transmission circuit suitable for an integrated circuit which employs insulated gate field effect transistors comprising a time sharing circuit, a restoring circuit and a transmission line between both circuits. The time sharing circuit includes the desired number of clocked inverters in accordance with the input information being time shared, the outputs of said clocked inverters being connected in common to form a wired OR circuit, said clocked inverters having a first IGFET responsive to said information and a second IGFET responsive to clock signals, both of said first and second transistors connected in series. The restoring circuit includes the desired number of clocked inverters in accordance with the time shared signal being restored, said clocked inverters having a third IGFET responsive to said time shared signals and a fourth IGFET responsive to the clock signals, both of said third and fourth transistors connected in series.

BRIEF DESCRIPTION OF THE DRAWINGS

A more complete appreciation of the invention will be readily obtained as the same becomes better understood by reference to the following detailed description when considered in connection with the accompanying drawings, wherein.

DETAILED DESCRIPTION OF THE PREFERRED EMBODIMENTS

Figure 1:
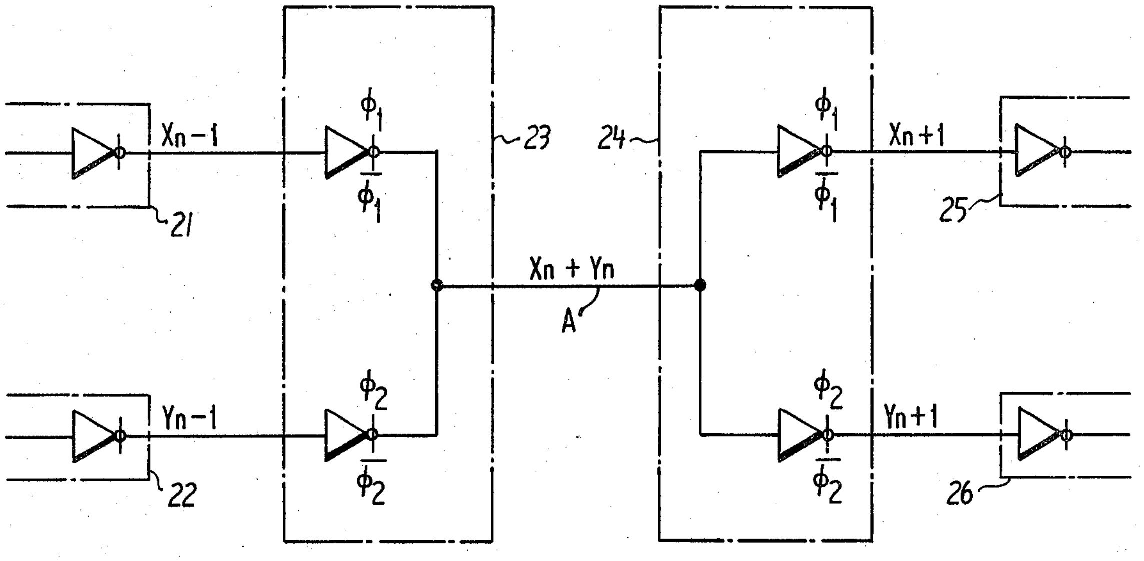
FIG. 1 is a schematic diagram of the time sharing information transmission circuit of the invention.

Referring now to the drawings, wherein like reference numerals designate identical or corresponding parts throughout the several views, and more particularly to FIG. 1 thereof, a schematic diagram of a time sharing information transmission circuit of the present invention is shown. The circuit comprises a time sharing circuit 23, a transmission line A and a restoring circuit 24. Both the time sharing and restoring circuits 23 and 24 are driven by clock signals $o_1$ and $o_2$. The clock signals $o_1$ and $o_2$ are also provided to both inverting circuits. Inverters 21 and 22 provide the transmission circuit with input information $X_{n-1}$ and $Y_{n-1}$, respectively. Inverters 25 and 26 are provided with output information $X_{n+1}$ and $Y_{n+1}$, respectively. The input information $X_{n-1}$ and $Y_{n-1}$ are time shared and are transmitted as time shared information signal $X_n + Y_n$, and are restored as the output information $X_{n+1}$ and $Y_{n+1}$, where the symbol + designates the logic OR operation and the suffixes $n1$, $n$ and $n+1$ indicate the time order of the information.

Figure 2:
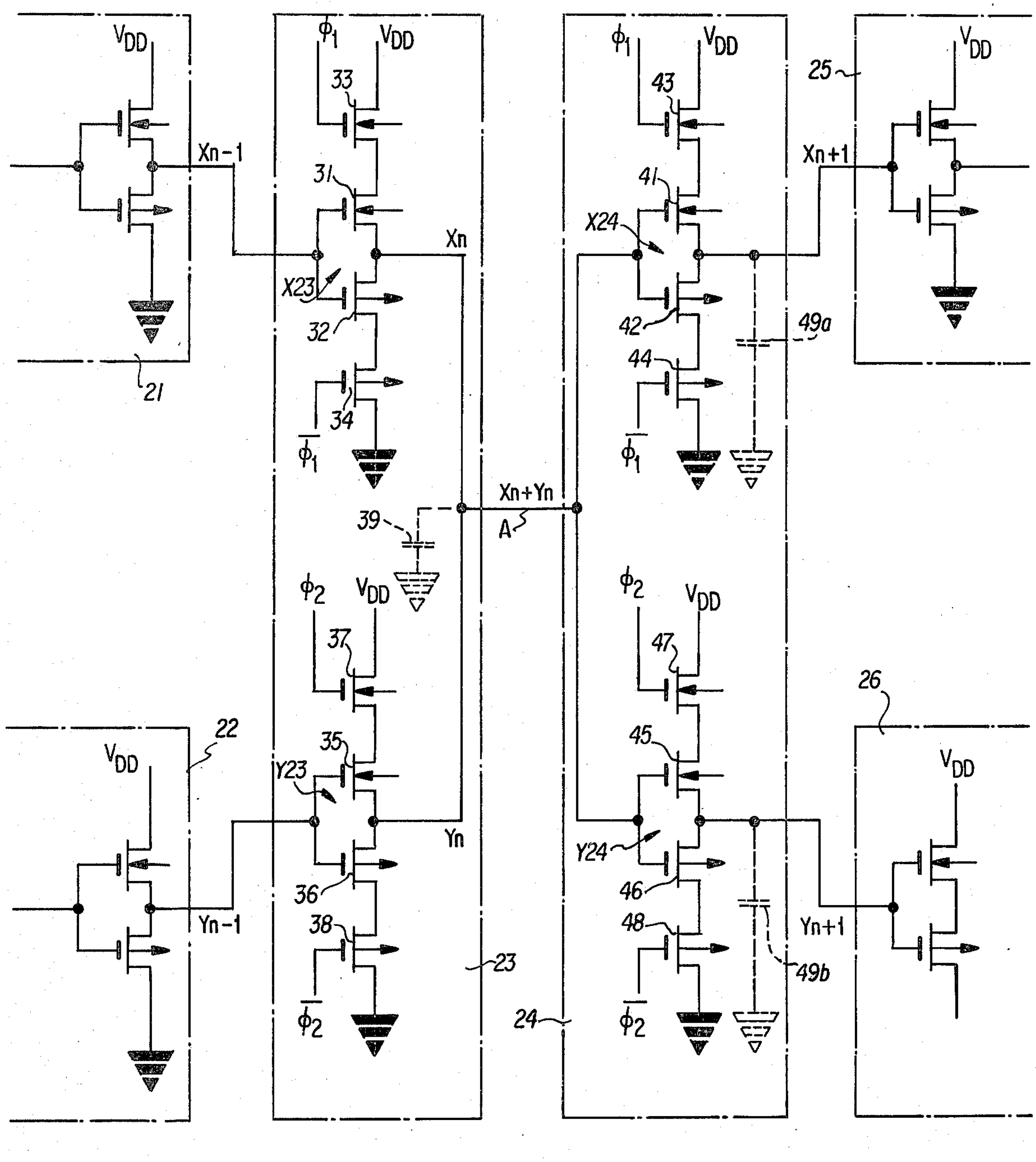
FIG. 2 is a circuit diagram of one embodiment of the invention which employs clocked inverters of the complementary channel conductivity type.

The embodiment of the invention shown in FIG. 1 is shown in more detail in the circuit diagram of the embodiment as seen in FIG. 2. Inverters 21, 22, 25 and 26 as input and output circuits include a pair of complementary channel conductivity type IGFETs, respectively. The time sharing circuit 23 comprises two clocked inverters $X_{23}$ and $Y_{23}$. The clocked inverter $X_{23}$ includes a pair of complementary channel conductivity type IGFETs 31 and 32 whose gate and drain electrodes are connected in common and whose source electrodes are connected to IGFETs 33 and 34 whose gate electrodes are provided with clock signals $\phi_1$ and $\overline{\phi_1}$, respectively. The IGFETs 33, 31, 32 and 34 are connected in series and are supplied with a bias potential $V_{DD}$ (−E volts) and earth potential. The channel conductivity types of IGFETs 33 and 31 are of the N type and that of IGFETs 32 and 34 are of the P type. The common gate of IGFETs 31 and 32 are provided with the input information $X_{n-1}$ and the common drain of IGFETs 31 and 32 provides an output signal $X_n$ to the transfer line A. A clocked inverter $Y_{23}$ is constructed similarly to the clocked inverter $X_{23}$. Namely, IGFETs 37, 35, 36 and 38 are connected in series between the bias potential $V_{DD}$ and earth potential. The common gate of IGFETs 35 and 36 are provided with input information $Y_{n-1}$ and the common surface of IGFETs 35 and 36 provide the output signal $Y_n$. The gates of IGFETs 37 and 38 are provided with clock signals $\phi_2$ and $\overline{\phi_2}$, respectively. The outputs of the clocked inverters $X_{23}$ and $Y_{23}$ are connected to the transmission line A, and the common node of the outputs are connected to the earth potential through a capacitor 39. Under the foregoing arrangement, the outputs of the clocked inverters $X_{23}$ and $Y_{23}$ are connected as a wired OR circuit.

On the other hand, the restoring circuit 24 comprises clocked inverters $X_{24}$ and $Y_{24}$ similar to the clocked inverters $X_{23}$ and $Y_{23}$. The clocked inverter $X_{24}$ includes IGFETs 43, 41, 42 and 44 connected in series between the bias potential and the earth potential. The common gate of the N channel conductivity type IGFET 41 and the P channel conductivity type IGFET 42 are provided with transmitted information to be restored and the common source of IGFETs 41 and 42 provides restored output information $X_{n+1}$ wherein the common source is connected to the earth potential through a capacitor 49*a*. Also, the clocked inverter $Y_{24}$ includes IGFETs 47, 45, 46 and 48 connected in series between the bias potential and the earth potential. The common gate of the IGFETs 45 and 46 are provided with the transmitted information to be restored and the common source of IGFETs 45 and 46 provide restored output information $Y_{n+1}$ wherein the common source is connected to the earth potential through a capacitor 49*b*. The clocked inverters $X_{24}$ and $Y_{24}$ are driven by the switching IGFETs 43 and 44 whose gates are supplied with clock signals $\phi_1$ and $\overline{\phi_1}$, respectively, and by the switching IGFETS 47 and 48 whose gates are supplied with clock signals $\phi_2$ and $\overline{\phi_2}$, respectively.

Figure 3:
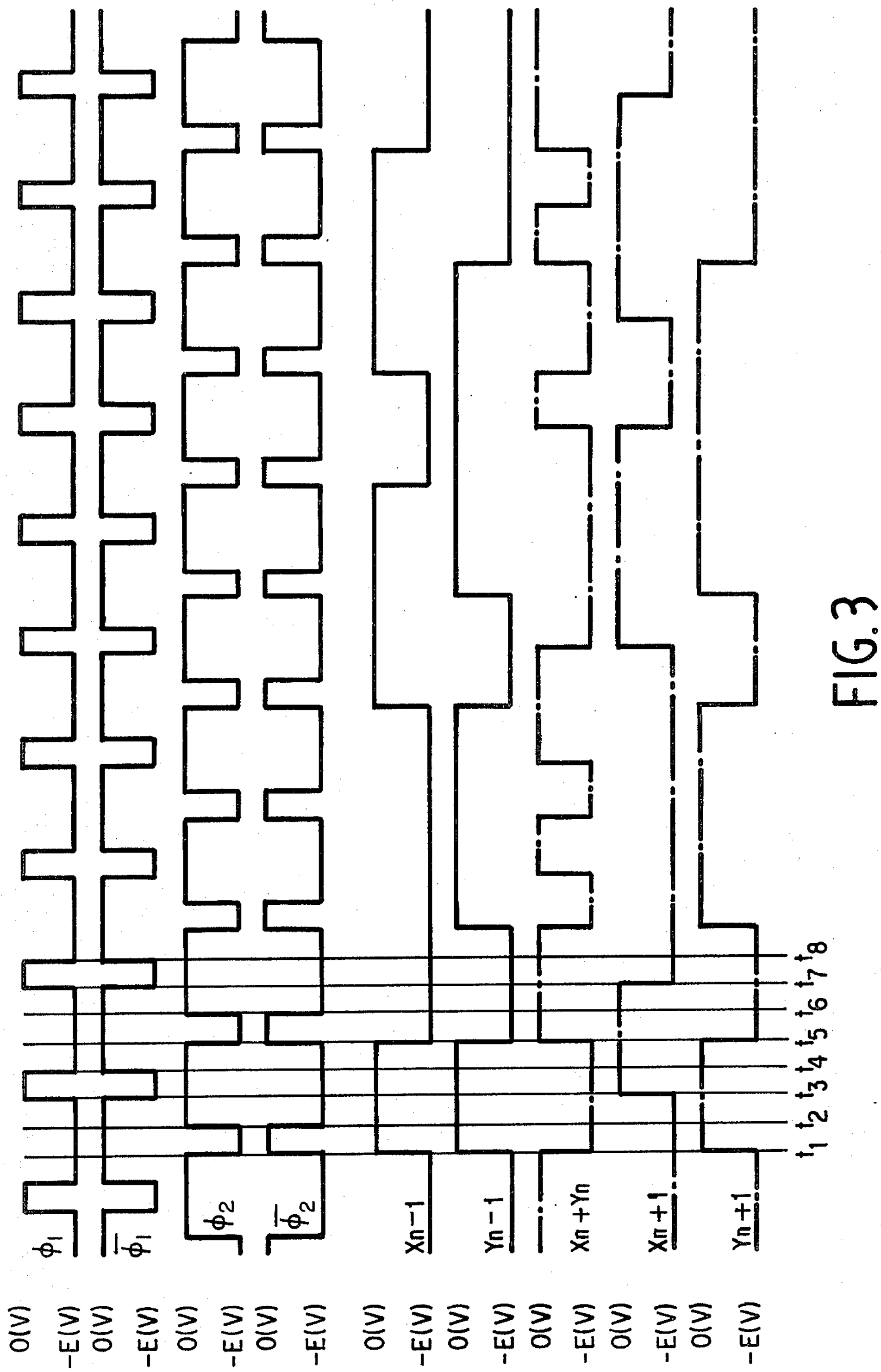
FIG. 3 is a timing chart which shows the timing of the circuit of FIG. 2.

Referring now to FIG. 3, the operation of the above described circuit will be explained. It is assumed, for the sake of a clear explanation, that output signals of the inverters 21 and 22, shown in FIG. 3 as $X_{n-1}$ and $Y_{n-1}$, are synchronized to the clock signals $\phi_2$ and $\overline{\phi_2}$ which differ from the clock signals $\phi_1$ and $\overline{\phi_1}$ in phase and synchronization with the clock signals $\phi_1$ and $\overline{\phi_1}$. Further, it is assumed that the N channel conductivity type of IGFET can be in its ON state and the P channel conductivity type of IGFET can be in its OFF state when a signal supplied at their gates is 0 volts, and that the N type IGFET can be in its OFF state and the P type IGFET can be in its ON state when their gate signals are −E volts. As shown in FIG. 3, the clock signal $\phi_1$ has a positive voltage (0 volts) and the clock signal $\overline{\phi_1}$ has a negative voltage (−E volts) in time intervals $t_3$–$t_4$ and $t_7$–$t_8$ so that IGFET 33 whose gate is supplied with the clock signal $\phi_1$ and IGFET 34 whose gate is supplied with the clock signal $\overline{\phi_1}$ must be in their ON states. In the time interval $t_3$–$t_4$, IGFET 31 is in its ON state and IGFET 32 is in its OFF state because the input information signal $X_{n-1}$ from the inverter 21, being 0 volts, is supplied at the gates of the IGFETS 31 and 32. Therefore, the input information signal $X_{n-1}$, being a positive voltage (0 volts), is inverted by the clocked inverter $X_{23}$ and is transmitted to the transmission line A as the output signal $X_n$ having a negative voltage (−E volts). In the time interval $t_3$–$t_4$, since IGFET 31 has been in its ON state and IGFET 32 in its OFF state, the capacitor 39, located at the transmission line A as sum of the input capacity of the next stage and the interconnection capacity of the line A, will be charged to −E volts through the low impedance path of the bias voltage source $V_{DD}$ (−E volts) IGFET 33, IGFET 31, and the output terminal of the clocked inverter $X_{23}$. On the other hand, in the time interval $t_7$–$t_8$ the clock signals $\phi_1$ and $\overline{\phi}_1$ are supplied as positive and negative voltages, respectively, and the input information signal $X_{n-1}$ has a negative voltage so that IGFETs 32 and 34 are in their ON states and IGFETs 31 and 33 are in their OFF states. Then the capacitor 39 will be charged to 0 volts through the low impedance path of the output terminal of the clocked inverter $X_{23}$, IGFET 32, IGFET 34, and the earth potential. Under these operations, when the clock signals $\phi_1$ and $\overline{\phi_1}$ are not supplied, for example in the time interval $t_4$–$t_7$, IGFETs 33 and 34 are in their ON states so that the charge of the capacitor 39 will be maintained for a predetermined time in spite of the input state of the information $X_{n-1}$ of the inverter 21 due to the high impedance between the output $X_n$ and both the bias source $V_{DD}$ and the earth potential.

Inverters 22, $Y_{23}$, $Y_{24}$ and 26 which pertain to information $Y_{n-1}$, $Y_n$ and $Y_{n+1}$ have entirely the same operation as the inverters 21, $X_{23}$, $X_{24}$ and 25 with respect to the information $X_{n-1}$, $X_n$ and $X_{n+1}$, as explained above. The clock signals $\phi_2$ and $\overline{\phi_2}$ and the information signals $Y_{n-1}$, $Y_n$ and $Y_{n+1}$ are also shown in FIG. 3.

The information signals $X_n$ and $Y_n$ are transmitted through the line A as information signal $X_n + Y_n$, time shared by the time sharing circuit 23. More specifically, the input information signal $X_{n-1}$ from the inverter 21 is transferred to the output as the output information signal $X_n$ by the clocked inverter $X_{23}$ when the clock signals $\phi_1$ and $\overline{\phi_1}$ are supplied, for example, only in the time intervals $t_3$–$t_4$ and $t_7$–$t_8$, and the input information signal $Y_{n-1}$ from the inverter 22 is transferred to the output as the output information signal $Y_n$ by the clocked inverter $Y_{23}$ when the clock signals $\phi_2$ and $\overline{\phi_2}$ are supplied, for example, only in the time intervals $t_1$–$t_2$ and $t_5$–$t_6$.

The circuit operation after the time $t_3$ will become more apparent with the aid of the following explanation. In the time interval $t_3$–$t_4$, the capacitor at the side of the output information signal $X_n + Y_n$ will be charged to −E volts through the low impedance path of the bias source $V_{DD}$, IGFET 33, IGFET 31, and the output $X_n$, because only the clocked inverter $X_{23}$ out of the inverters $X_{23}$ and $Y_{23}$ operates during the times that the input signal $X_{n-1}$ from the inverter 22 has a positive voltage (0 volts), the input signal $Y_{n-1}$ from the inverter 22 has a positive voltage (0 volts), and only clock signals $\phi_1$ and $\overline{\phi_1}$ are supplied. Next, in the time interval $t_4$–$t_5$, the capacitor maintains its charge of −E volts because the clocked inverters $X_{23}$ and $Y_{23}$ do not transfer the input signals $X_{n-1}$ and $Y_{n-1}$ to the line A during the time that the input signals $X_{n-1}$ and $Y_{n-1}$ have a positive voltage (0 volts), and the clock signals $\phi_1$, $\overline{\phi_1}$, $\phi_2$ and $\overline{\phi_2}$ are not supplied. In the next time interval $t_5$–$t_6$, the charge of −E volts on capacitor 39 will be discharged through the low impedance path of the output $Y_n$, IGFET 36, IGFET 38, and the earth potential, and will have a charge of 0 volts because the input signals $X_{n-1}$ and $Y_{n-1}$ are −E volts and the clock signals $\phi_2$ and $\overline{\phi_2}$ are supplied so that IGFETs 37 and 38 turn to their ON state and IGFETs 35 and 36 turn to their OFF state. In time interval $t_6$–$t_7$, the capacitor 39 maintains its charge of 0 volts because the input signals $X_{n-1}$ and $Y_{n-1}$ are −E volts and all of the clock signals $\phi_1$, $\overline{\phi_1}$, $\phi_2$ and $\overline{\phi_2}$ are not supplied so that the clocked inverters $X_{23}$ and $Y_{23}$ cannot transfer the input information $X_{n-1}$ and $Y_{n-1}$. Operation during the next time interval can be performed in accordance with the state of the signals $X_{n-1}$, $Y_{n-1}$, $\phi_1$, $\overline{\phi_1}$, $\phi_2$, and $\overline{\phi_2}$ as shown in FIG. 3. In FIG. 3, the dotted line of the output information $X_n + Y_n$ represents the time when the ouptut information is stored in the capacitor 39, for example, during time intervals $t_4$–$t_5$ and $t_6$–$t_7$.

The input information signal $X_n + Y_n$ to the restoring circuit 24 is not only time shared by the clock signals $\phi_1$, $\overline{\phi_1}$, $\phi_2$ and $\overline{\phi_2}$ but is also synchronized to the clock signals $\phi_1$, $\overline{\phi_1}$, $\phi_2$ and $\overline{\phi_2}$, as explained above so that it will be able to be restored by the restoring circuit 24 which comprises clocked inverters $X_{24}$ and $Y_{24}$. Namely, in time interval $t_7$–$t_8$ of FIG. 3, when IGFETs 43 and 44 are supplied with clock signals $\phi_1$ and $\overline{\phi_1}$, the operation of the clocked inverter $X_{24}$ is determined by the input signal $X_n + Y_n$ from the transmission line A. As shown in FIG. 3, IGFET 31 will turn to its ON state and IGFET 42 turns OFF in accordance with the positive voltage (0 volts) of the input signal $X_n + Y_n$. A capacitor 49*a* is charged to −E volts through the low impedance path of the bias source $V_{DD}$, IGFET 43, IGFET 41, and the output $X_{n-1}$ of the clocked inverter $X_{24}$, as explained with respect to time sharing circuit 23. On the other hand, in the time interval $t_3$–$t_4$, when IGFETs 43 and 44 are supplied with the clock signals $\phi_1$ and $\overline{\phi_1}$, IGFETs 43 and 44 turn ON, IGFET 41 turns OFF, and IGFET 42 turns ON, in accordance with the input signal $X_n + Y_n$ having a negative voltage (−E volts). Therefore, the capacitor 49*a* will be discharged to 0 volts through a low impedance path comprising the output $X_{n+1}$ of the clocked inverter $X_{24}$, IGFET 42, IGFET 44, and the earth potential. As to the clocked inverter $Y_{24}$, its operation is explained, as well as the clocked inverter $X_{24}$, in accordance with the input information $X_n + Y_n$ and the clocked inverter $X_{24}$ can restore the output information $X_{n+1}$ out of the input information $X_n + Y_n$ time shared by the clock signals $\phi_1$, $\overline{\phi_1}$, $\phi_2$ and $\overline{\phi_2}$, and the clocked inverter can restore the output information $Y_{n+1}$ out of the input information $X_n + Y_n$ time shared by them. Namely, the clocked inverter $X_{24}$ can restore only when the clock signals $\phi_1$ and $\overline{\phi_1}$ are being supplied, and the clocked inverter $Y_{24}$ can restore only when the clock signals $\phi_1$ and $\overline{\phi_1}$ are being supplied with the input information $X_n + Y_n$ synchronized to the clock signals $\phi_1$, $\overline{\phi_1}$, $\phi_2$ and $\overline{\phi_2}$.

According to the above-described embodiment, multi-input information, for example $X_{n-1}$ and $Y_{n-1}$, is time shared by the time sharing circuit 23 as a single $X_n + Y_n$ and then it is restored by the restoring circuit 23 to the original information. Thus, the embodiment has many advantages over the prior art, such as only requiring one bias voltage source, high speed switching time and a very small swing of the clock signal.

Figure 4:
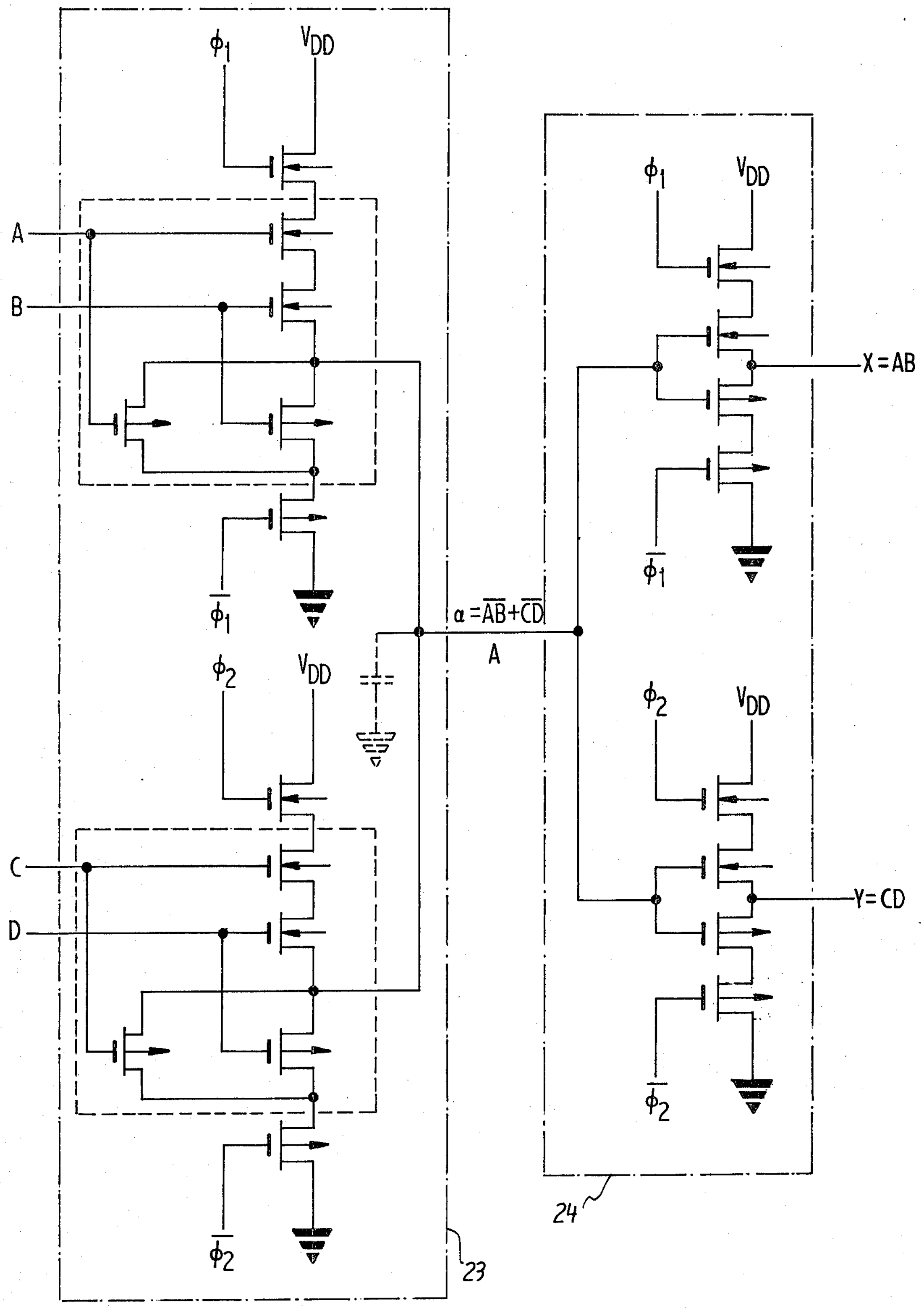
FIG. 4 is a circuit diagram of another embodiment of the invention which employs clocked inverters acting in an input logic operation.
Figure 5:
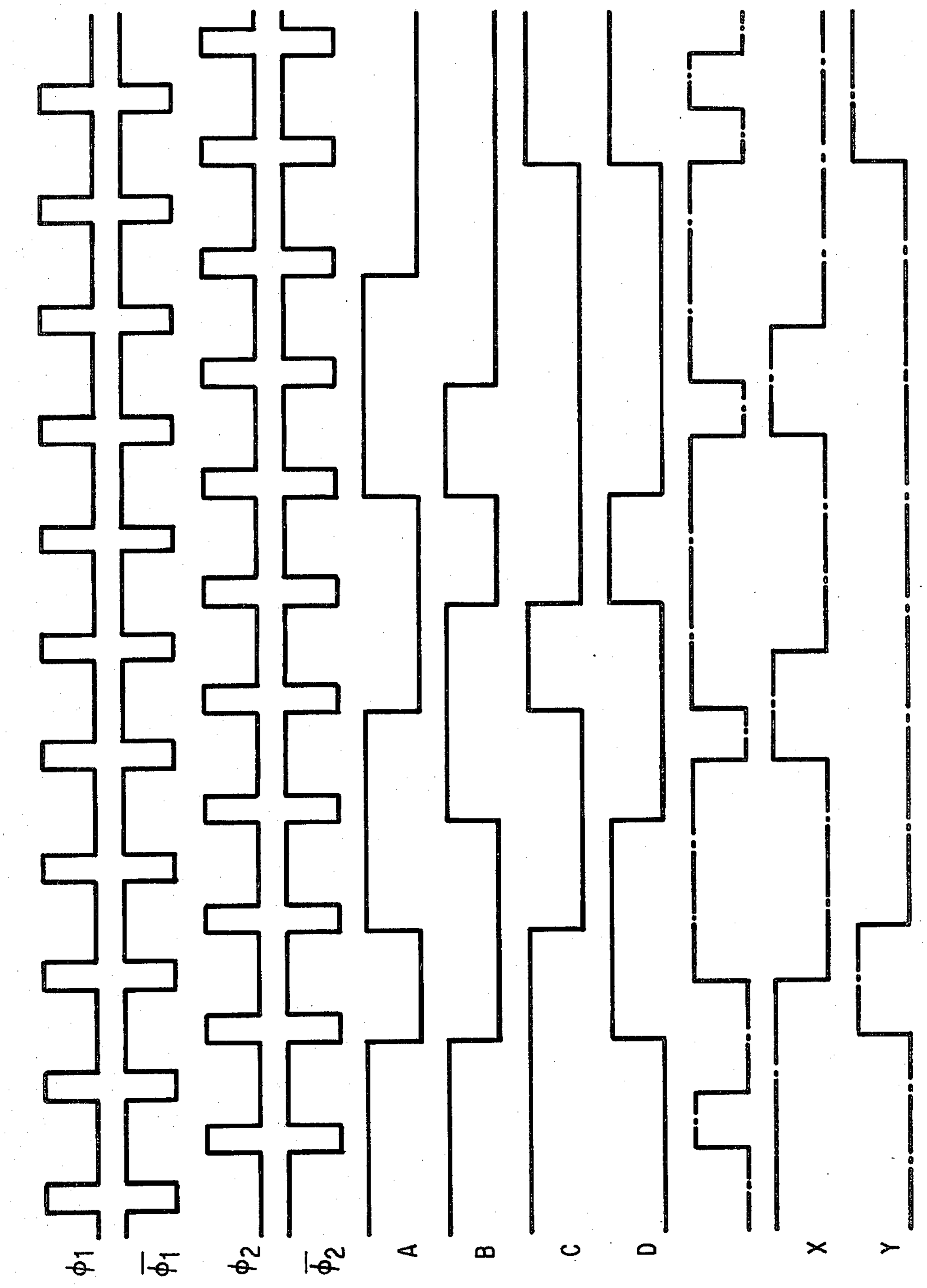
FIG. 5 is a timing chart which shows the timing of the circuit of FIG. 4.

In FIG. 4 and FIG. 5, another embodiment of the present invention is shown. This embodiment employs an input logic circuit in the time sharing circuit 23 which is enclosed by a dotted line. Inputs A and B are operated on by a NAND operation represented by $\overline{AB}$, and inputs C and D are also operated on by a NAND operation represented by $\overline{CD}$. Thereafter, time shared information $\alpha = \overline{AB} + \overline{CD}$ is transmitted. The time sharing operation and restoring operation of this embodiment is the same as that of the first embodiment shown in FIG. 2. This embodiment has the additional capability of time sharing input information during an input logic operation.

Figure 6:
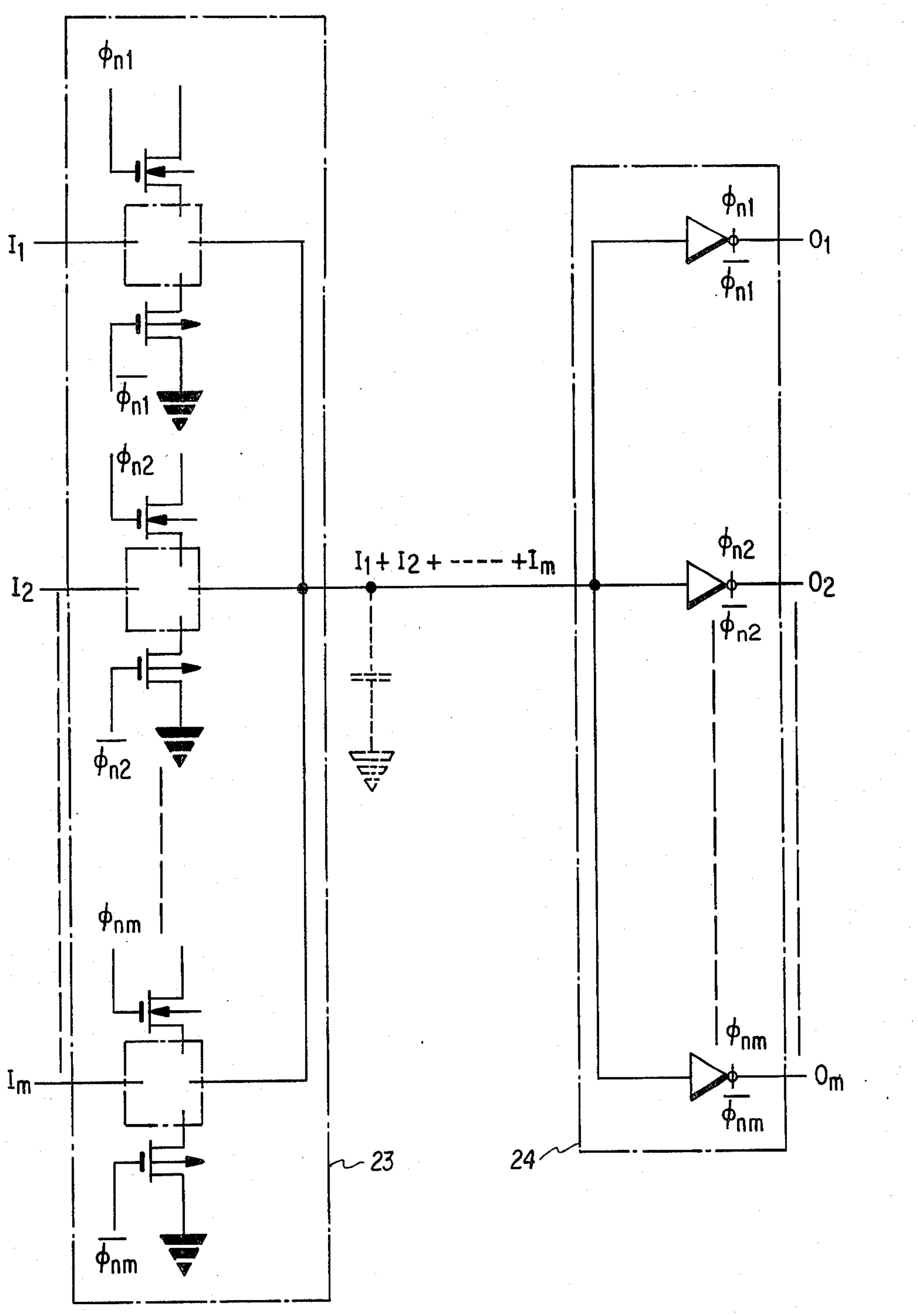
FIG. 6 is a circuit diagram of another embodiment of the invention which has *m* numbers of input information and *m* phases of clock signals.

Another embodiment is shown in FIG. 6, which employs multiphase clock signals $\phi_{n1} \ldots \phi_{nm}$ and multi-inputs $I_1 \ldots I_m$, instead of the first embodiment shown in FIG. 2 which employs two phase clock signals $\phi_1$ and $\phi_2$ and two inputs $X_{n-1}$ and $Y_{n-1}$.

Figure 7:
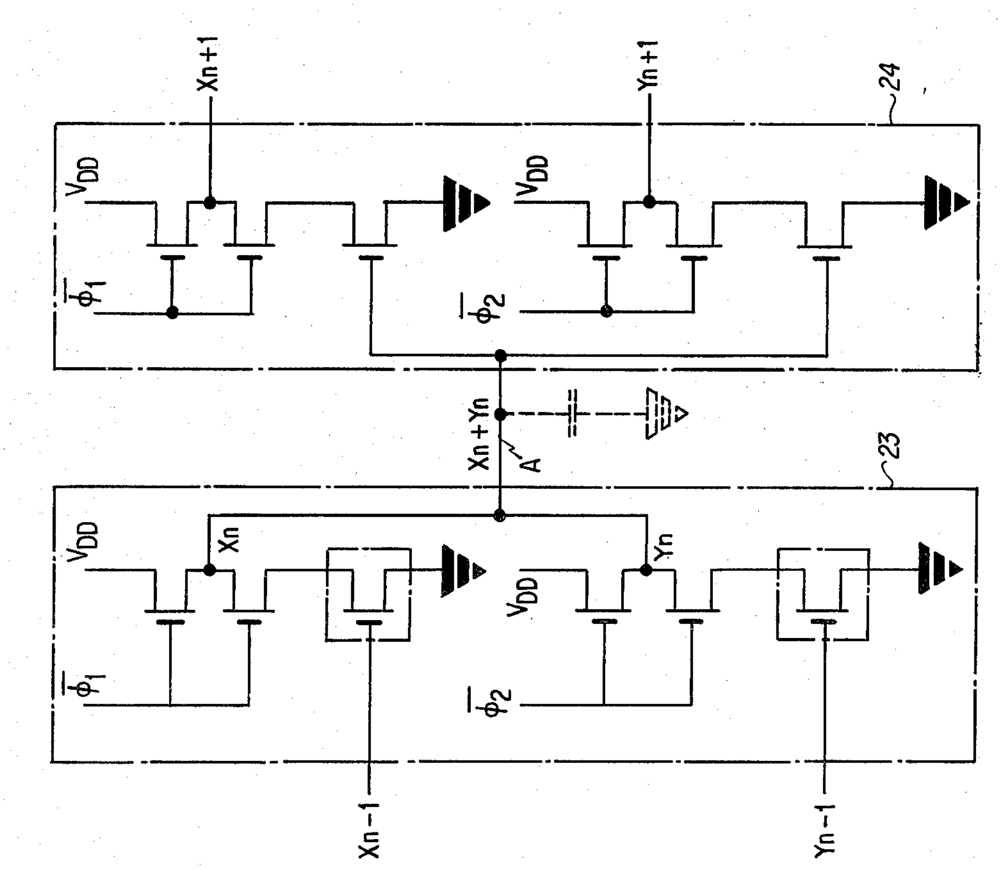
FIG. 7 is a circuit diagram of another embodiment of the invention which employs clocked inverters of the one channel conductivity type.

In FIG. 7, another embodiment of the present invention is illustrated which employs on channel (P channel or N channel) conductivity type of IGFET instead of complementary channel conductivity types of IFGETs shown in FIG. 2.

Figure 9:
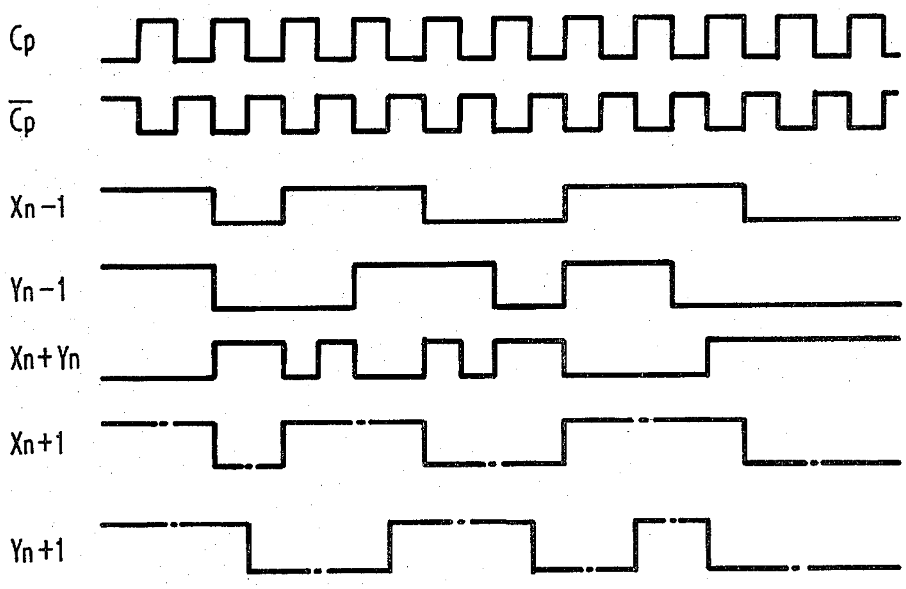
FIG. 9 is a timing chart which shows the timing of the circuit of FIG. 8.
Figure 8:
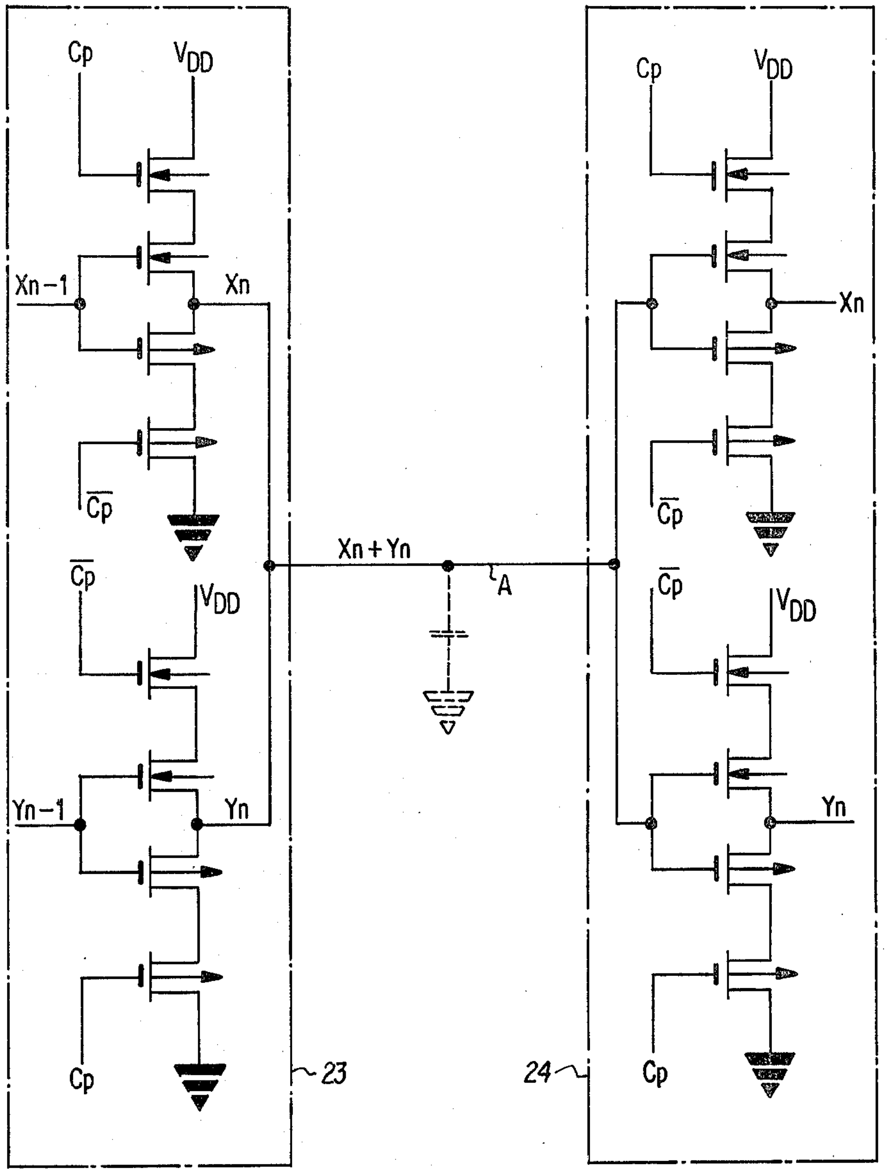
FIG. 8 is a circuit diagram of another embodiment of the invention which is driven by one phase clock signals.

In FIG. 8, another embodiment of the present invention is illustrated which employs a one phase clock signal $Cp$ instead of a two phase clock signal $o_1$ and $o_2$, shown in FIG. 2. FIG. 9 shows the operational waveforms of FIG. 8.

Figure 10:
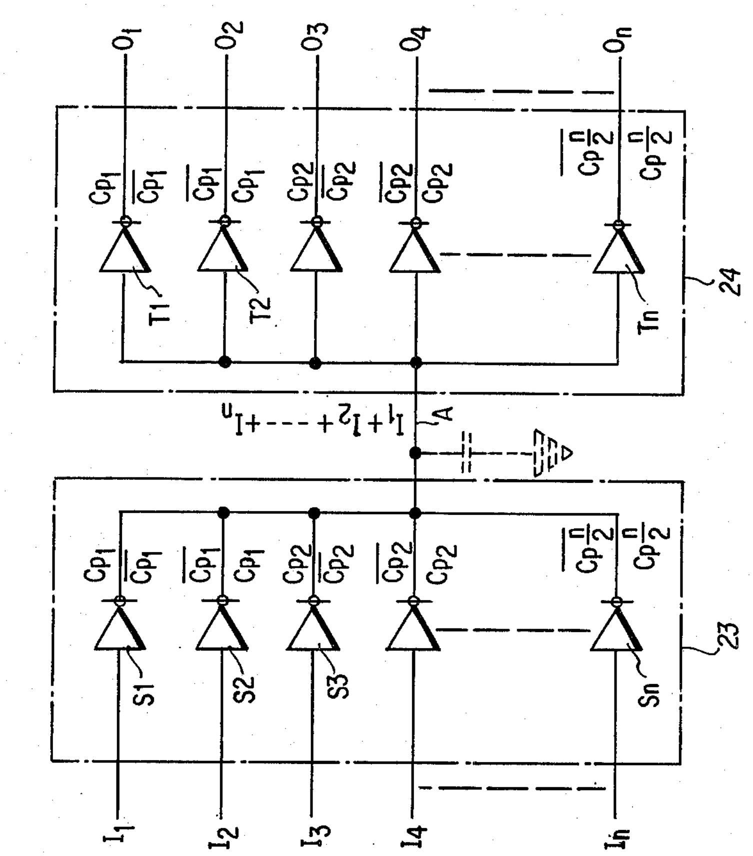
FIG. 10 is a schematic diagram of another embodiment of the invention which has *n* numbers of input information and *n*/2 phases of clock signals.

Another embodiment is shown in FIG. 10, which employs *n* input signals $I_1 \ldots I_n$ and n clocked inverters $S_1 \ldots S_n$, and also employs $n/2$ clock signals $Cp_1 \ldots Cp_{n/2}$. In this embodiment, the time sharing circuit 23, time shared by the clock signal $Cp_1 \ldots Cp_{n/2}$, comprises a wired OR connection and the restoring circuit 24 employing clocked inverters $T_1 \ldots T_n$ is synchronized to the clock signals $Cp_1 \ldots Cp_{n/2}$.

Obviously, numerous modifications and variations of the present invention are possible in light of the above teachings. For example, it is obvious to combine the various embodiments with respect to the input logic circuit, the input information and the clock signals. It is therefore understood that within the scope of the appended claims, the invention may be practiced otherwise than as specifically described herein.

What is claimed as new and desired to be secured by Letters Patent of the United States is:

1. A time sharing information transmission circuit comprising, a time sharing circuit having two inputs and an output, a restoring circuit having one input and two outputs, a transmission line connected between the output of said time sharing circuit and the input of said restoring circuit, said time sharing circuit comprising, a first insulated gate field effect transistor, a second insulated gate field effect transistor, a third insulated gate field effect transistor, a fourth insulated gate field effect transistor, a fifth insulated gate field effect transistor, a sixth insulated gate field effect transistor, a seventh insulated gate field transistor, an eighth insulated gate field effect transistor, means connecting a first clock signal to said first transistor, means connecting a first voltage source to said first transistor, means connecting said first transistor to said second transistor, means connecting said second transistor to said third transistor, means connecting a first information signal to said second and third transistors, means connecting said third transistor to said fourth transistor, means connecting a second clock signal to said fourth transistor, means connecting said fourth transistor to a fifth voltage source, means connecting a third clock signal to said fifth transistor, means connecting a second voltage source to said fifth transistor, means connecting said fifth transistor to said sixth transistor, means connecting said sixth transistor to said seventh transistor, means connecting a second information signal to said sixth and seventh transistors, means connecting said seventh transistor to said eighth transistors, means connecting a fourth clock signal to said eighth transistor, means connecting connecting said eighth transistor to a sixth voltage source, means connecting said second and third transistors to said input of said transmission line, means connecting said sixth and seventh transistors to said input of said transmission line, said restoring circuit comprising, a ninth insulated gate field effect transistor, a tenth insulated gate field effect transistor, an eleventh insulated gate field effect transistor, a twelfth insulted gate field effect transistor, a thirteenth insulated gate field effect transistor, a fourteenth insulated gate field effect transistor, a fifteenth insulated gate field effect transistor, a sixteenth insulated gate field effect transistor, means connecting said first clock signal to said ninth transistor, means connecting a third voltage source to said ninth transistor, means connecting said ninth transistor to said tenth transistor, means connecting said tenth transistor and said eleventh transistor to a first output of said restoring circuit, means connecting the output of said transmission line to said tenth and eleventh transistors, means connecting said eleventh transistor to said twelfth transistor, means connecting said second clock signal to said twelfth transistor, means connecting said twelfth transistor to a seventh voltage source, means connecting said third clock signal to said thirteenth transistor, means connecting a fourth voltage source to said thirteenth transistor, means connecting said thirteenth transistor to said fourteenth transistor, means connecting said fourteenth transistor and said fifteenth transistor to a second output of said restoring circuit, means connecting the output of said transmission line to said fourteenth and fifteenth transistors, means connecting said fifteenth transistor to said sixteenth transistor, means connecting said fourth clock signal to said sixteenth transistor, means connecting said sixteenth transistor to an eighth voltage source.

2. A time sharing information transmission circuit in accordance with claim 1 wherein said first, second, fifth, sixth, ninth, tenth, thirteenth and fourteenth transistors are of one type and said third, fourth, seventh, eighth, eleventh, twelfth, fifteenth and sixteenth are of a complimentary type.

3. A time sharing information transmission circuit in accordance with claim 2 wherein the wave form of said first clock signal is a mirror image of the wave form of said second clock signal and the wave form of said third clock signal is a mirror image of the wave form of said fourth clock signal.

4. A time sharing information transmission circuit comprising, a time sharing circuit having four inputs and an output, a restoring circuit having one input and two outputs, a transmission line connected between the output of said time sharing circuit and the input of said restoring circuit, said time sharing circuit comprising, a first insulated gate field effect transistor, a third insulated gate field effect transistor, a fourth insulated gate field effect transistor, a fifth insulated gate field effect transistor, a sixth insulated gate field effect transistor, a seventh insulated gate field effect transistor, an eighth insulated gate field effect transistor, a ninth insulated gate field effect transistor, a tenth insulated gate field effect transistor, an eleventh insulated gate field effect transistor, a twelfth insulated gate field effect transistor, means connecting a first clock signal to said first transistor, means connecting a first voltage source to said first transistor, means connecting said first transistor to said second transistor, means connecting said second transistor to said third transistor, means connecting said third transistor to said fifth transistor, means connecting said fifth transistor to said sixth transistor, means connecting said fourth transistor to said sixth transistor, means connecting said third, fourth and fifth transistors to the input of said transmission line, means connecting a second clock signal to said sixth transistor, means connecting said sixth transistor to a fifth voltage source, means connecting a first information signal to said second and fourth transistors, means connecting a second information signal to said third and fifth transistors, means connecting a third clock signal to said seventh transistor, means connecting a second voltage source to said seventh transistor,
means connecting said seventh transistor to said eighth transistor,
means connecting said eighth transistor to said ninth transistor,
means connecting said ninth transistor to said eleventh transistor,
means connecting said eleventh transistor to said twelfth transistor,
means connecting said tenth transistor to said twelfth transistor,
means connecting said ninth, tenth and eleventh transistors to the input of said transmission line,
means connecting a fourth clock signal to said twelfth transistor,
means connecting said twelfth transistor to a sixth voltage source,
means connecting a third information signal to said eighth and tenth transistors,
means connecting a fourth information signal to said ninth and eleventh transistors,
said restoring circuit comprising,
a thirteenth insulated gate field effect transistor,
a fourteenth insulated gate field effect transistor,
a fifteenth insulated gate field effect transistor,
a sixteenth insulated gate field effect transistor,
a seventeenth insulated gate field effect transistor,
an eighteenth insulated gate field effect transistor,
a nineteenth insulated gate field effect transistor,
a twentieth insulated gate field effect transistor,
means connecting said first clock signal to said thirteenth transistor,
means connecting a third voltage source to said thirteenth transistor,
means connecting said thirteenth transistor to said fourteenth transistor,
means connecting said fourteenth transistor and said fifteenth transistor to a first output of said restoring circuit,
means connecting said fifteenth transistor to said sixteenth transistor,
means connecting said second clock signal to said sixteenth transistor,
means connecting said sixteenth transistor to a seventh voltage source,
means connecting the output of said transmission line to said fourteenth and fifteenth transistors,
means connecting said third clock signal to said seventeenth transistor,
means connecting a fourth voltage source to said seventeenth transistor,
means connecting said seventeenth transistor to said eighteenth transistor,
means connecting said eighteenth transistor and said nineteenth transistor to a second output of said restoring circuit,
means connecting the output of said transmission line to said eighteenth and nineteenth transistors,
means connecting said nineteenth transistor to said twentieth transistor,
means connecting said fourth clock signal to said twentieth transistor,
means connecting said twentieth transistor to an eighth voltage source.

5. A time sharing information transmission circuit in accordance with claim 4, wherein said first, second, third, seventh, eighth, ninth, thirteenth, fourteenth, seventeenth and eighteenth transistors are of one type and said fourth, fifth, sixth, tenth, eleventh, twelfth, fifteenth, sixteenth, nineteenth and twentieth transistors are of a complimentary type.

6. A time sharing information transmission circuit in accordance with claim 5, wherein the wave form of said first clock signal is a mirror image of the wave form of said second clock signal and the wave form of said third clock signal is a mirror image of the wave form of said fourth clock signal.

7. A time sharing information transmission circuit comprising,
a time sharing circuit having two inputs and an output,
a restoring circuit having one input and two outputs,
a transmission line connected between the output of said time sharing circuit and the input of said restoring circuit,
said time sharing circuit comprising,
a first insulated gate field effect transistor,
a second insulated gate field effect transistor,
a third insulated gate field effect transistor,
a fourth insulated gate field effect transistor,
a fifth insulated gate field effect transistor,
a sixth insulated gate field effect transistor,
means connecting a first clock signal to said first and second transistors,
means connecting a first voltage source to said first transistor,
means connecting said first transistor to said second transistor,
means connecting said first and second transistors to the input of said transmission line,
means connecting said second transistor to said third transistor,
means connecting an information signal to said third transistor,
means connecting said third transistor to a fifth voltage source,
means connecting a second clock signal to said fourth and fifth transistors,
means connecting a second voltage source to said fourth transistor,
means connecting said fourth transistor to said fifth transistor,
means connecting said fourth and fifth transistors to the input of said transmission line,
means connecting said fifth transistor to said sixth transistor,
means connecting a second information signal to said sixth transistor,
means connecting said sixth transistor to a sixth voltage source,
said restoring circuit comprising,
a seventh insulated gate field effect transistor,
an eighth insulated gate field effect transistor,
a ninth insulated gate field effect transistor,
a tenth insulated gate field effect transistor,
an eleventh insulated gate field effect transistor,
a twelfth insulated gate field effect transistor,
means connecting said first clock signal to said seventh and eighth transistors,
means connecting a third voltage source to said seventh transistor,
means connecting said seventh transistor and said eighth transistor to a first output of said restoring circuit, means connecting said eighth transistor to said ninth transistor, means connecting the output of said transmission line to said ninth transistor, means connecting said ninth transistor to a seventh voltage source, means connecting said second clock signal to said tenth and eleventh transistors, means connecting a fourth voltage source to said tenth transistor, means connecting said tenth transistor and said eleventh transistor to a second output of said restoring circuit, means connecting said eleventh transistor to said twelfth transistor, means connecting the output of said transmission line to said twelfth transistor, means connecting said twelfth transistor to an eighth voltage source.

8. A time sharing information transmission circuit in accordance with claim 7, wherein said first, second, third, fourth, fifth, sixth, seventh, eighth, ninth, tenth, eleventh and twelfth transistors are each of the same type.

9. A time sharing information transmission circuit comprising, a time sharing circuit having two inputs and an output, a restoring circuit having one input and two outputs, a transmission line connected between the output of said time sharing circuit and the input of said restoring circuit, said time sharing circuit comprising, a first insulated gate field effect transistor, a second insulated gate field effect transistor, a third insulated gate field effect transistor, a fourth insulated gate field effect transistor, a fifth insulated gate field effect transistor, a sixth insulated gate field effect transistor, a seventh insulated gate field effect transistor, an eighth insulated gate field effect transistor, means connecting a first clock signal to said first transistor, means connecting a first voltage source to said first transistor, means connecting said first transistor to said second transistor, means connecting said second transistor to said third transistor, means connecting a first information signal to said second and third transistors, means connecting said second and third transistors to the input of said transmission line, means connecting said third transistor to said fourth transistor, means connecting a second clock signal to said fourth transistor, means connecting said fourth transistor to a fifth voltage source, means connecting said second clock signal to said fifth transistor, means connecting a second voltage source to said fifth transistor, means connecting said fifth transistor to said sixth transistor, means connecting said sixth transistor to said seventh transistor, means connecting a second information signal to said sixth and seventh transistors, means connecting said sixth and seventh transistors to the input of said transmission line, means connecting said seventh transistor to said eighth transistor, means connecting said first clock signal to said eighth transistor, means connecting said eighth transistor to a sixth voltage source, said restoring circuit comprising, a ninth insulated gate field effect transistor, a tenth insulated gate field effect transistor, an eleventh insulated gate field effect transistor, a twelfth insulated gate field effect transistor, a thirteenth insulated gate field effect transistor, a fourteenth insulated gate field effect transistor, a fifteenth insulated gate field effect transistor, a sixteenth insulated gate field effect transistor, means connecting said first clock signal to said ninth transistor, means connecting a third voltage source to said ninth transistor, means connecting said ninth transistor to said tenth transistor, means connecting said tenth transistor and said eleventh transistor to a first output of said restoring circuit, means connecting the output of said transmission line to said tenth and eleventh transistors, means connecting said eleventh transistor to said twelfth transistor, means connecting said second clock signal to said twelfth transistor, means connecting said twelfth transistor to a seventh voltage source.

means connecting said second clock signal to said thirteenth transistor, means connecting a fourth voltage source to said thirteenth transistor, means connecting said thirteenth transistor to said fourteenth transistor, means connecting said fourteenth transistor and said fifteenth transistor to a second output of said restoring circuit, means connecting the output of said transmission line to said fourteenth and fifteenth transistors, means connecting said fifteenth transistor to said sixteenth transistor, means connecting said first clock signal to said sixteenth transistor, means connecting said sixteenth transistor to an eighth voltage source.

10. A time sharing information transmission circuit in accordance with claim 9, wherein said first, second, fifth, sixth, ninth, tenth, thirteenth and fourteenth transistors are of one type and said third, fourth, seventh, eighth, eleventh, twelfth, fifteenth and sixteenth transistors are of a complimentary type.

11. A time sharing information transmission circuit in accordance with claim 10, wherein the wave form of said first clock signal is a mirror image of the wave form of said second clock signal.

* * * * *